United States Patent
Dutterer

(10) Patent No.: US 11,097,388 B2
(45) Date of Patent: Aug. 24, 2021

(54) FENCE FOR TABLE SAW

(71) Applicant: TTI (MACAO COMMERCIAL OFFSHORE) LIMITED, Macau (MO)

(72) Inventor: David E. Dutterer, Belton, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 16/256,287

(22) Filed: Jan. 24, 2019

(65) Prior Publication Data

US 2019/0240793 A1 Aug. 8, 2019

Related U.S. Application Data

(60) Provisional application No. 62/627,486, filed on Feb. 7, 2018.

(51) Int. Cl.
*B23Q 1/28* (2006.01)
*B23D 45/06* (2006.01)
(Continued)

(52) U.S. Cl.
CPC .............. *B23Q 1/28* (2013.01); *B23D 45/06* (2013.01); *B23Q 3/005* (2013.01); *B27B 27/02* (2013.01); *B27B 27/10* (2013.01)

(58) Field of Classification Search
CPC .......... B23Q 1/28; B23Q 3/005; B27B 27/02; B27B 27/10; B27B 27/00; B27B 27/04;
(Continued)

(56) References Cited

U.S. PATENT DOCUMENTS

| 13,670 | A | * | 10/1855 | Worden | .................. | B27B 27/02 |
| | | | | | | 83/438 |
| 58,498 | A | * | 10/1866 | Stanley | .................. | B27B 27/02 |
| | | | | | | 83/438 |

(Continued)

FOREIGN PATENT DOCUMENTS

| EP | 2484473 A1 | 8/2012 |
| GB | 2477815 A | 8/2011 |

(Continued)

OTHER PUBLICATIONS

"Bracket." Merriam-Webster.com Dictionary, Merriam-Webster, https://www.merriam-webster.com/dictionary/bracket. Accessed Sep. 30, 2020. (Year: 2020).*

*Primary Examiner* — Jonathan G Riley
(74) *Attorney, Agent, or Firm* — Michael Best & Friedrich LLP

(57) ABSTRACT

A fence assembly for a table saw includes a primary fence including a first elongated body having a first body first side, a first body second side, a first body top side, and a first body bottom side, and a first height measured between the first body top side and the first body bottom side. A secondary fence is pivotally mounted to the primary fence and pivotable between a deployed position adjacent one of the first body first side or the first body second side, and a stowed position adjacent the other of the first body first side or the first body second side. The secondary fence includes a second elongated body having a second body top side and a second body bottom side, and a second height measured between the second body top side and the second body bottom side. The second height is less than the first height.

11 Claims, 10 Drawing Sheets

(51) Int. Cl.
*B23Q 3/00* (2006.01)
*B27B 27/02* (2006.01)
*B27B 27/10* (2006.01)

(58) Field of Classification Search
CPC .......... B27B 27/06; B27B 27/08; B27B 5/16; B27B 5/181; B27B 5/22; B27B 5/222; B23D 45/06; B23D 45/02; B23D 33/10; B23D 47/04; B23D 47/045; Y10T 83/7593; Y10T 83/7607; Y10T 83/7647
See application file for complete search history.

(56) References Cited

U.S. PATENT DOCUMENTS

| | | | | |
|---|---|---|---|---|
| 61,988 | A * | 2/1867 | Behel | B27B 27/02 83/438 |
| 453,893 | A * | 6/1891 | Smith | B27B 27/02 83/438 |
| 544,787 | A * | 8/1895 | Heath | B43L 7/125 33/454 |
| 785,699 | A * | 3/1905 | Bemis | B27B 27/02 83/438 |
| 816,424 | A * | 3/1906 | Bemis | B27B 27/02 83/438 |
| 836,006 | A * | 11/1906 | Bemis | B27B 27/02 83/438 |
| 1,401,560 | A * | 12/1921 | Royle | B27B 27/06 83/438 |
| 4,432,263 | A * | 2/1984 | Kowalchuk | B23Q 3/005 83/438 |
| 4,558,618 | A * | 12/1985 | Bachmann | B27B 27/02 269/303 |
| 4,782,871 | A * | 11/1988 | Aigner | B23Q 3/005 144/117.1 |
| 4,964,450 | A * | 10/1990 | Hughes | B23D 47/025 144/286.5 |
| 5,038,486 | A | 8/1991 | Ducate, Sr. | |
| 5,228,374 | A * | 7/1993 | Santeramo, Sr. | B27B 27/02 83/438 |
| 5,722,308 | A * | 3/1998 | Ceroll | B23Q 3/007 144/253.1 |
| 5,845,410 | A * | 12/1998 | Boker | B27B 25/10 33/536 |
| 6,095,024 | A | 8/2000 | Brutscher et al. | |
| 6,578,461 | B1 | 6/2003 | Loo | |
| 7,127,976 | B1 * | 10/2006 | Fitzsimmons | B23D 47/045 83/435.11 |
| 8,616,104 | B2 | 12/2013 | Frolov et al. | |
| 9,168,597 | B2 * | 10/2015 | Wiker | B25H 1/04 |
| 9,993,938 | B2 * | 6/2018 | Chen | B23D 45/06 |
| 10,213,937 | B2 * | 2/2019 | Duan | B27B 27/08 |
| 10,759,083 | B1 * | 9/2020 | Chang | B23D 47/025 |
| 2002/0108480 | A1 * | 8/2002 | Hewitt | B27B 27/02 83/446 |
| 2005/0204884 | A1 | 9/2005 | Huang | |
| 2006/0201297 | A1 * | 9/2006 | Friend | B27B 25/02 83/436.1 |
| 2008/0092707 | A1 * | 4/2008 | Aigner | B27B 25/10 83/441 |
| 2011/0197733 | A1 * | 8/2011 | Liu | B27B 27/02 83/444 |
| 2012/0055307 | A1 * | 3/2012 | Burke | B27B 27/02 83/446 |
| 2016/0046034 | A1 * | 2/2016 | Burke | B27B 27/02 269/315 |
| 2016/0121412 | A1 * | 5/2016 | Fulmer | B23D 45/06 83/477.2 |

FOREIGN PATENT DOCUMENTS

| | | |
|---|---|---|
| WO | 8700479 A1 | 1/1987 |
| WO | 0043155 A1 | 7/2000 |

* cited by examiner

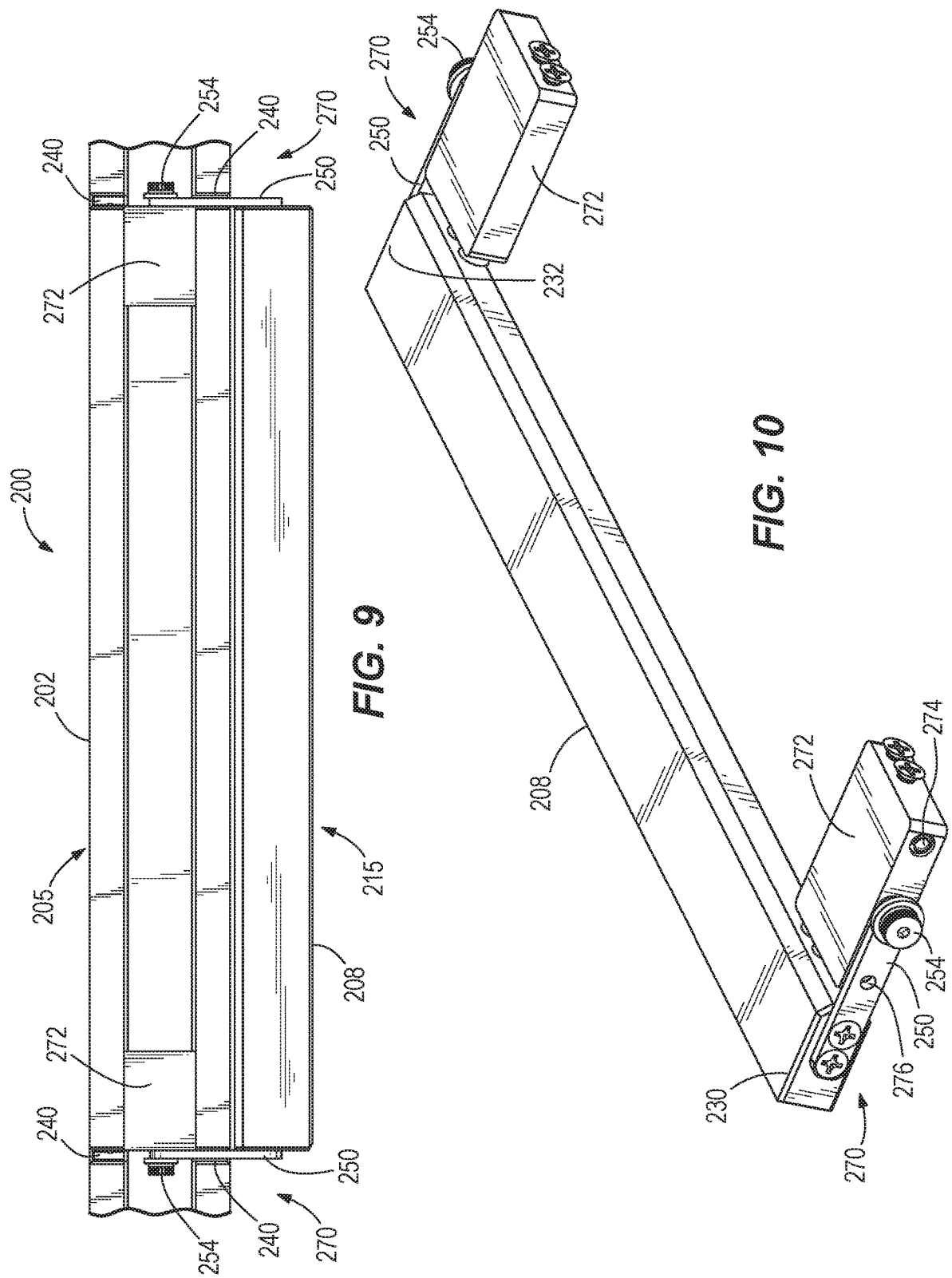

FENCE FOR TABLE SAW

CROSS-REFERENCE TO RELATED APPLICATIONS

This application claims priority to U.S. Provisional Patent Application No. 62/627,486 filed on Feb. 7, 2018, the entire content of which is incorporated herein by reference.

FIELD OF THE INVENTION

The present invention relates generally to table saws, and more specifically to a table saw fence assemblies.

BACKGROUND OF THE INVENTION

Table saws typically include a table supporting a saw blade, and a fence capable of supporting a workpiece during cutting operations. Such fences typically extend to a substantial height above the table in order to support larger workpieces.

SUMMARY OF THE INVENTION

The present invention provides, in one aspect, a fence assembly for a table saw, the fence assembly including a primary fence and a secondary fence pivotally mounted to the primary fence. The primary fence includes a first elongated body having a first body first side, a first body second side, a first body top side, and a first body bottom side. A first body height is measured between the first body top side and the first body bottom side. The secondary fence is pivotable between a deployed position adjacent one of the first body first side or the first body second side, and a stowed position adjacent the other of the first body first side or the first body second side. The secondary fence includes a second elongated body having a second body top side and a second body bottom side. A second height is measured between the second body top side and the second body bottom side. The second height is less than the first height.

In some embodiments, the secondary fence includes a window and a knob supported at least partially within the window. The knob is located at a proximal end of a fastener configured to engage a threaded bore in the primary fence to releasably secure the secondary fence in one of the deployed position or the stowed position.

In some embodiments, the primary fence includes a first bracket having an elongated bracket slot, and the secondary fence includes a second bracket slidably and rotatably coupled to the first bracket to reposition the secondary fence between the deployed position and the stowed position.

In some embodiments, the first elongated body includes a fence slot that receives the second bracket in one of the deployed position or the stowed position.

In some embodiments, the second elongated body includes a truss having a plurality of truss members.

In some embodiments, the secondary fence includes a locating pin, and the primary fence includes a locating aperture configured to receive the locating pin to locate the secondary fence relative to the primary fence in one of the deployed position or the stowed position.

In some embodiments, the primary fence includes a positioning member, and the secondary fence includes a bracket rotatably coupled to the positioning member to reposition the secondary fence between the deployed position and the stowed position.

In some embodiments, the positioning member includes a detent, and the bracket includes a detent recess configured to receive the detent. The detent and the detent recess together releasably secure the secondary fence in the deployed position or the stowed position.

In some embodiments, the first elongated body further includes a first body infeed end and a first body outfeed end, and a first body length measured between the first body infeed end and the first body outfeed end. The second elongated body further includes a second body infeed end and a second body outfeed end, and a second body length measured between the first body infeed end and the first body outfeed end. The second length is less than the first length.

In some embodiments, the first height is at least 60 mm, and wherein the second height is between 9 mm and 18 mm.

The present invention provides, in another aspect, a table saw including a table having a saw blade slot disposed therein. The table saw further includes a fence assembly positionable upon the table. The fence assembly includes a primary fence and a secondary fence pivotally mounted to the primary fence. The primary fence includes a first elongated body having a first height. The secondary fence is pivotable between a deployed position and a stowed position. The secondary fence includes a second elongated body having a second height that is less than the first height. When the fence assembly is positioned on the table, the secondary fence is proximate the saw blade slot while in the deployed position, and the secondary fence is positioned farther from the saw blade slot while in the stowed position.

In some embodiments, the secondary fence includes a window and a knob supported at least partially within the window. The knob is located at a proximal end of a fastener configured to engage a threaded bore in the primary fence to releasably secure the secondary fence in one of the deployed position or the stowed position.

In some embodiments, the primary fence includes a first bracket having an elongated bracket slot, and the secondary fence includes a second bracket slidably and rotatably coupled to the first bracket to reposition the secondary fence between the deployed position and the stowed position.

In some embodiments, the first elongated body includes a fence slot that receives the second bracket in one of the deployed position or the stowed position.

In some embodiments, the second elongated body comprises a truss having a plurality of truss members.

In some embodiments, the secondary fence includes a locating pin, and the primary fence includes a locating aperture configured to receive the locating pin to locate the secondary fence relative to the primary fence in one of the deployed position or the stowed position.

In some embodiments, the primary fence includes a positioning member, and the secondary fence includes a bracket rotatably coupled to the positioning member to reposition the secondary fence between the deployed position and the stowed position.

In some embodiments, the positioning member includes a detent, and the bracket includes a detent recess configured to receive the detent. The detent and the detent recess together releasably secure the secondary fence in the deployed position or the stowed position.

In some embodiments, the first elongated body further includes a first body infeed end and a first body outfeed end, and a first body length measured between the first body infeed end and the first body outfeed end. The second elongated body further includes a second body infeed end and a second body outfeed end, and a second body length measured between the first body infeed end and the first body outfeed end. The second length is less than the first length.

In some embodiments, the first height is at least 60 mm, and wherein the second height is between 9 mm and 18 mm.

Other features and aspects of the invention will become apparent by consideration of the following detailed description and accompanying drawings.

BRIEF DESCRIPTION OF THE DRAWINGS

FIG. 9 is a bottom view of the fence assembly of FIG. 7.

FIG. 10 is a perspective view of the fence assembly of FIG. 7 with portions removed.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
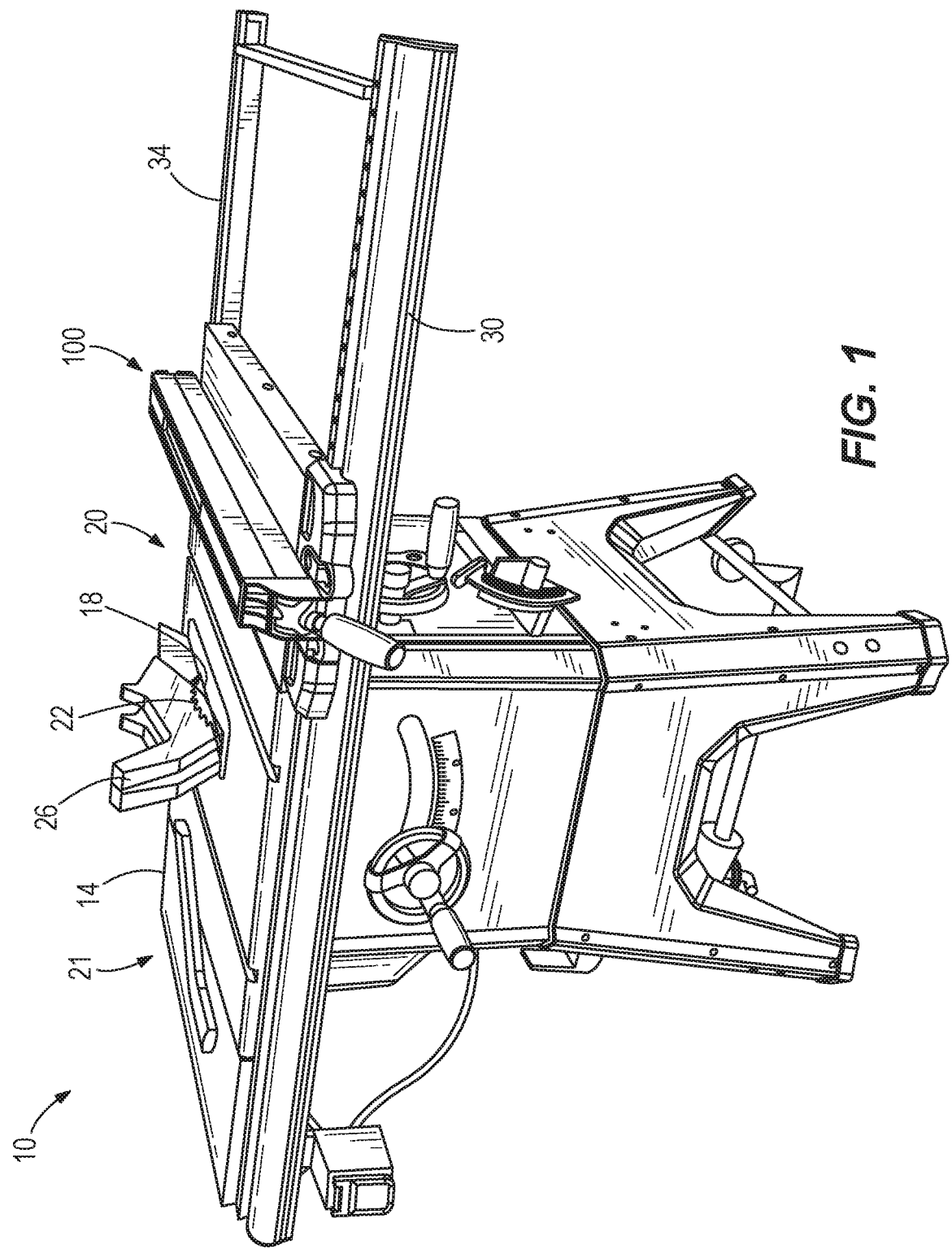
FIG. 1 is a perspective view of a table saw having a fence assembly in accordance with an embodiment of the invention.

FIG. 1 illustrates a table saw 10 for cutting a workpiece (not shown). The table saw 10 includes a table 14 having a saw blade slot 18 that permits a saw blade 22 to at least partially protrude therethrough. The table includes a first cutting surface 20 partially bounded by the saw blade slot 18, and a second cutting surface 21 partially bounded by the saw blade slot 18 and located opposite the first cutting surface 20. A guard 26 surrounds the saw blade 22 adjacent the saw blade slot 18 and pivots toward and away from the table 14. Front and rear guide rails 30, 34, respectively, extend generally parallel to one another at opposite sides of the table 14. A fence assembly 100 removably mounts to the rails 30, 34 to guide the workpiece during operation of the table saw 10. The fence assembly 100 is repositionable on either side of the saw blade slot 18.

Figure 2:
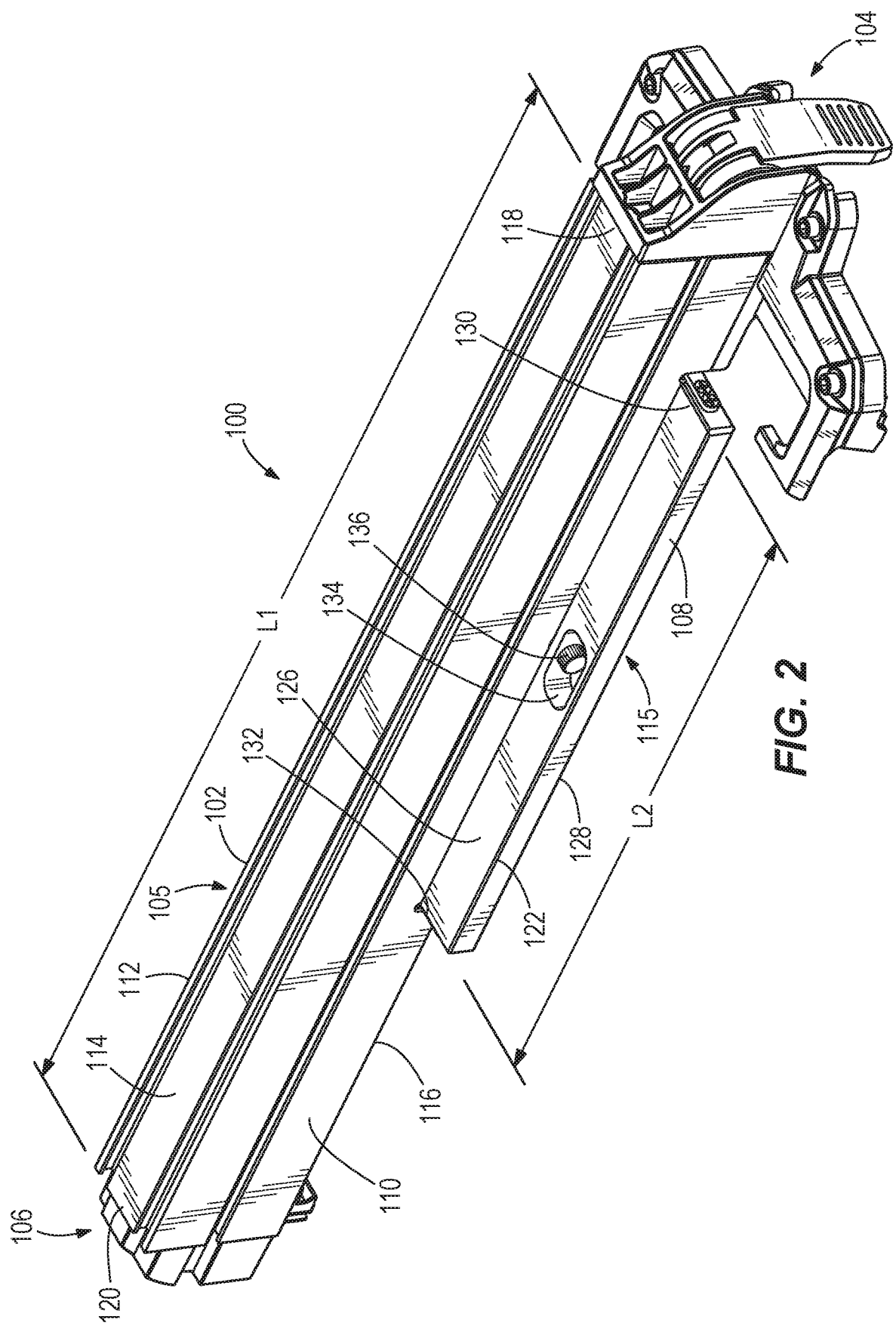
FIG. 2 is a top perspective view of the fence assembly of FIG. 1.
Figure 3:
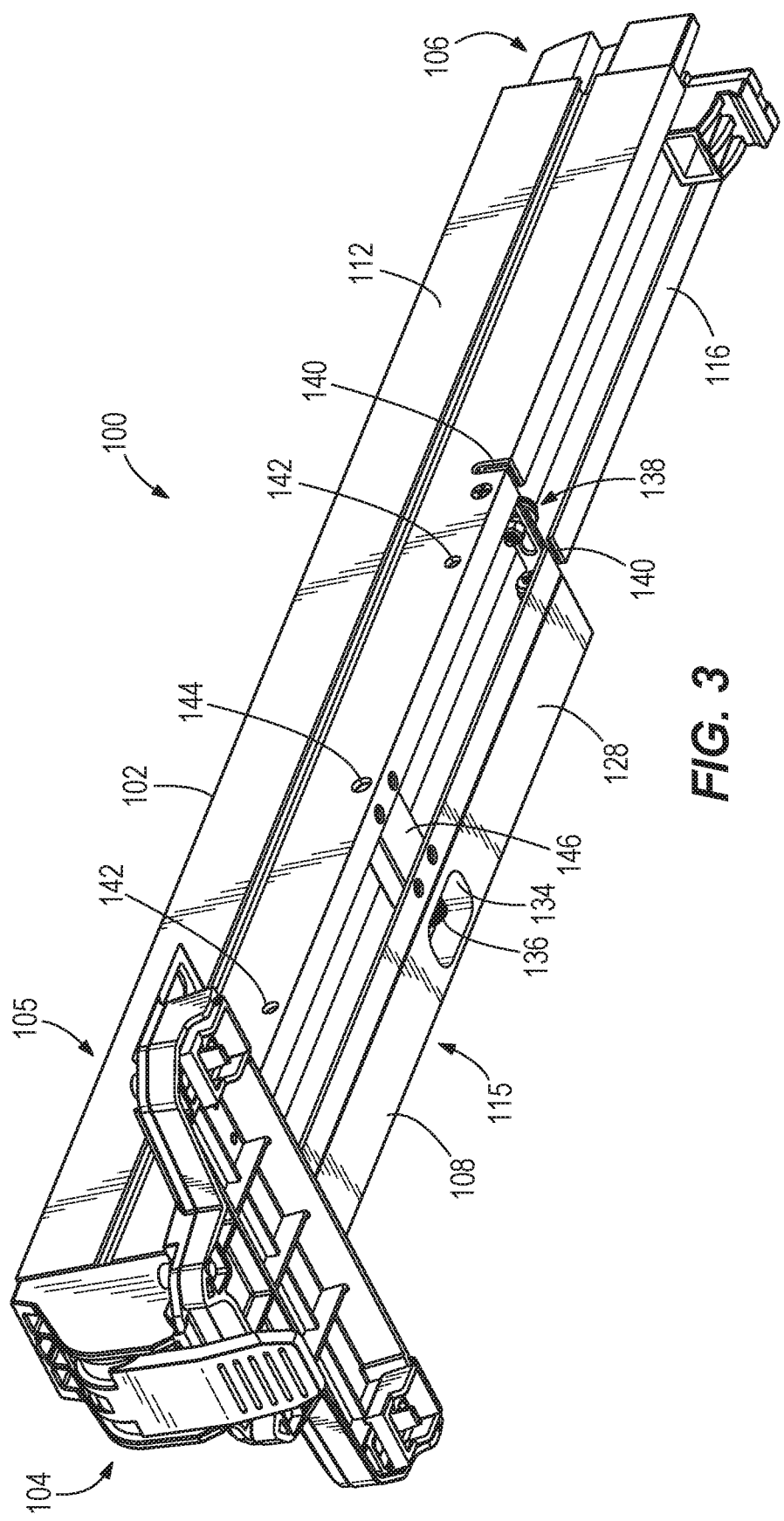
FIG. 3 is a bottom perspective view of the fence assembly of FIG. 1.

With reference to FIGS. 2 and 3, the fence assembly 100 includes a primary fence 105 and a secondary fence 115 pivotally mounted to the primary fence 105. Primary fence 105 includes a substantially rectangular first elongated body 102 defined by first body first and second sides 110 and 112, first body top and bottom sides 114 and 116, and first body infeed and outfeed ends 118 and 120. Similarly, secondary fence 115 includes a substantially rectangular second elongated body 108 defined by second body first and second sides 122 and 124 (FIG. 5), second body top and bottom sides 126 and 128, and second body infeed and outfeed ends 130 and 132. Infeed and outfeed mounts 104, 106 are attached to the infeed and outfeed ends 118, 120, respectively, and slidably couple to the rails 30, 34 to adjustably position the fence assembly 100 along the table 14.

The first elongated body 102 includes a first length L1 measured between the first body infeed end 118 and the first body outfeed end 120. Similarly, the second elongated member 108 includes a second length L2 measured between the second body infeed end 130 and the second body outfeed end 132. In the illustrated embodiment, the second length L2 is less than the first length L1.

The secondary fence 115 includes a window 134 defined in the second elongated body 108. The window 134 provides access to a fence fastener 135 (FIG. 5) that extends through the second body second side 124 to releasably secure the secondary fence 115 to the primary fence 105. Specifically, the fence fastener includes a knob 136 situated within the window 134 and a threaded shaft 166 (FIG. 5) that is selectively received by a threaded bore 144 on each side 110, 112 of the primary fence 105 (FIG. 3). In the illustrated embodiment, the primary fence 105 includes a reinforcing member 146 fastened to the first elongated body 102 proximate the fence fastener 135, and the threaded bores 144 extend into the reinforcing member 146.

Figure 4:
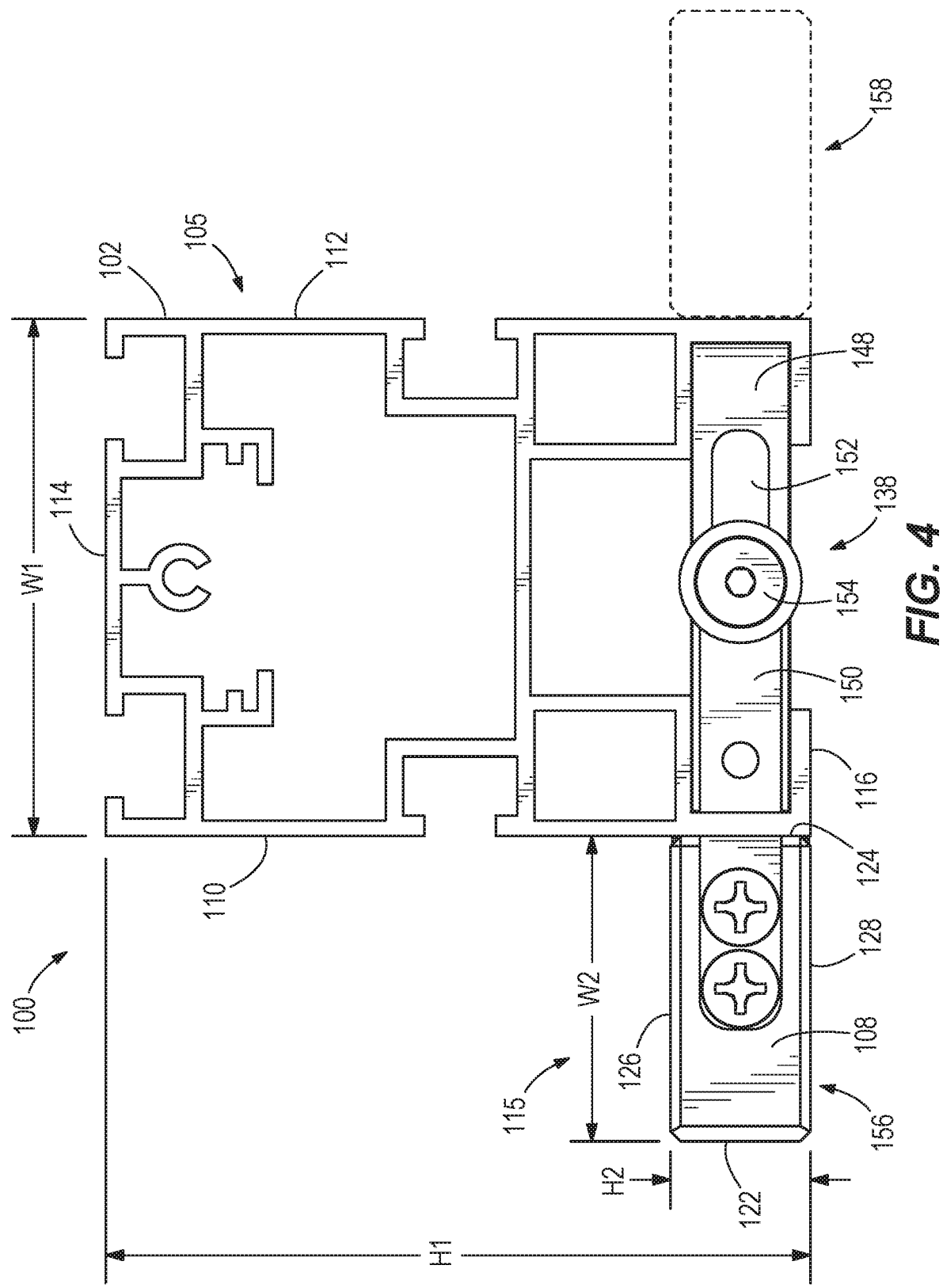
FIG. 4 is an end view of the fence assembly of FIG. 1 with portions removed.

With reference to FIG. 4, the first elongated body 102 includes a first height H1 measured between the first body top side 114 and the first body bottom side 116. Similarly, the second elongated member 108 includes a second height H2 measured between the second body top side 126 and the second body bottom side 128. In the illustrated embodiment, the second height H2 is less than the first height H1. The first height H1 can be at least 60 mm, and the second height H2 can be between 9 mm and 18 mm.

The shorter height of the second elongated body 108 permits the secondary fence 115 to be located nearer to the saw blade 22 (FIG. 1) than the primary fence 105 during operation of the table saw 10. For example, in some situations it is desirable to cut a very narrow strip from a workpiece. In such situations, the desired cutting width may be less than a width of the guard 26, so that the primary fence 105 cannot be set at the desired cutting width without interfering with the guard 26. Because the second height H2 is less than the first height H1, the secondary fence 115 can be set at a cutting width less than the width of the guard 26. Specifically, the guard 26 can be pivoted upward away from the table 14 just enough to rest the guard 26 against the second body top side 126 of the second elongated body 108. The guard 26 only need be pivoted upward a distance equal to the second height H2 of the second elongated body 108. Thus, the protruding height of the saw blade 22 need not be raised higher than necessary, which otherwise would be required in absence of the secondary fence 115 to raise the blade guard 26 above the primary fence 105, for performing a cutting operation of a narrow workpiece.

With continued reference to FIG. 4, the fence assembly 100 further includes a pivot mechanism 138 pivotally coupling the secondary fence 115 to the primary fence 105 proximate each end of the secondary fence 115. Each pivot mechanism 138 includes a first bracket 148 attached to the first elongated body 102, and a second bracket 150 attached to one of the second body infeed end 130 or the second body outfeed end 132 of the second elongated body 108. A shoulder bolt 154 pivotally and slidably couples the second bracket 150 to the first bracket 148 at an elongated bracket slot 152 formed in the first bracket 148.

Figure 6:
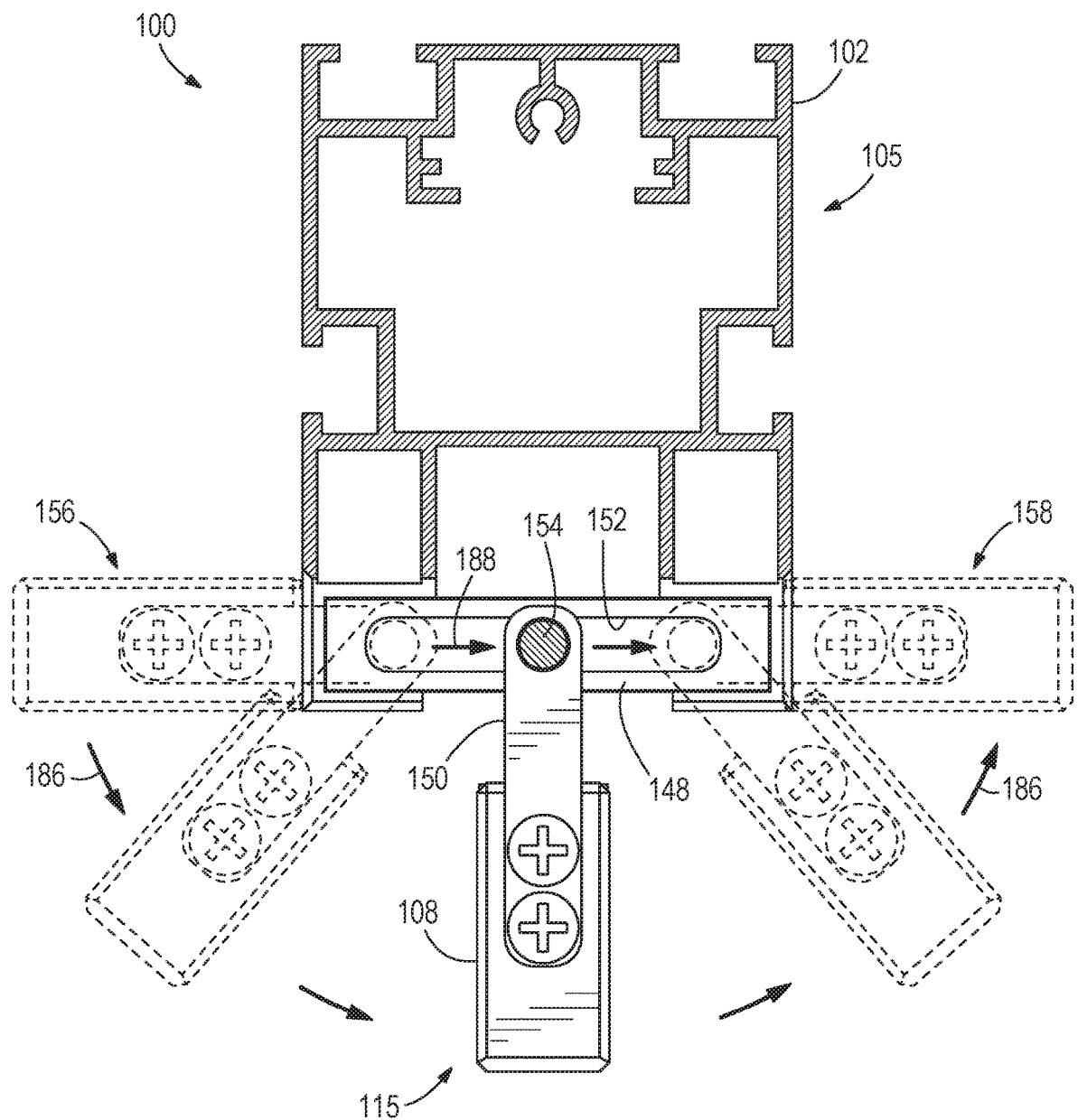
FIG. 6 is a schematic end view of the fence assembly of FIG. 1, illustrating a secondary fence pivoting from a first position to a second position.

With reference to FIGS. 4 and 6, the secondary fence 115 can relocate between a first position 156 and a second position 158 by swinging underneath the primary fence 105. In the illustrated embodiment, the secondary fence 115 is adjacent the first body first side 110 in the first position 156, and the secondary fence 115 is adjacent the first body second side 112 in the second position 158. When the fence assembly 100 is positioned on the first cutting surface 20 of the table 14 (FIG. 1), the secondary fence 115 is proximate the saw blade slot 18 while in the first position 156, and the secondary fence 115 is positioned farther from the saw blade slot 18 while in the second position 158. Thus, when the fence assembly 100 is positioned on the first cutting surface 20, the first position 156 is a deployed position and the second position 158 is a stowed position. Alternatively, the fence assembly 100 can be positioned on the second cutting surface 21 so that the second position 158 is a deployed position and the first position 156 is a stowed position.

While swinging between the first position 156 and the second position 158, the secondary fence 115 pivots about the shoulder bolt 154 in the direction of the first arrows 186 (FIG. 6). The bracket slot 152 also allows the second bracket 150 to slide relative to the first bracket 148, in the direction of the second arrow 188. With reference FIG. 3, the first elongated member 102 also includes fence slots 140 defined in the first body bottom side 116 and extending upward into a portion of first body first and second sides 110 and 112. As the secondary fence 115 pivots between the first and second positions 156 and 158, the fence slots 140 receive the second bracket 150 to prevent the second bracket 150 from interfering with the first elongated body 102.

Figure 5:
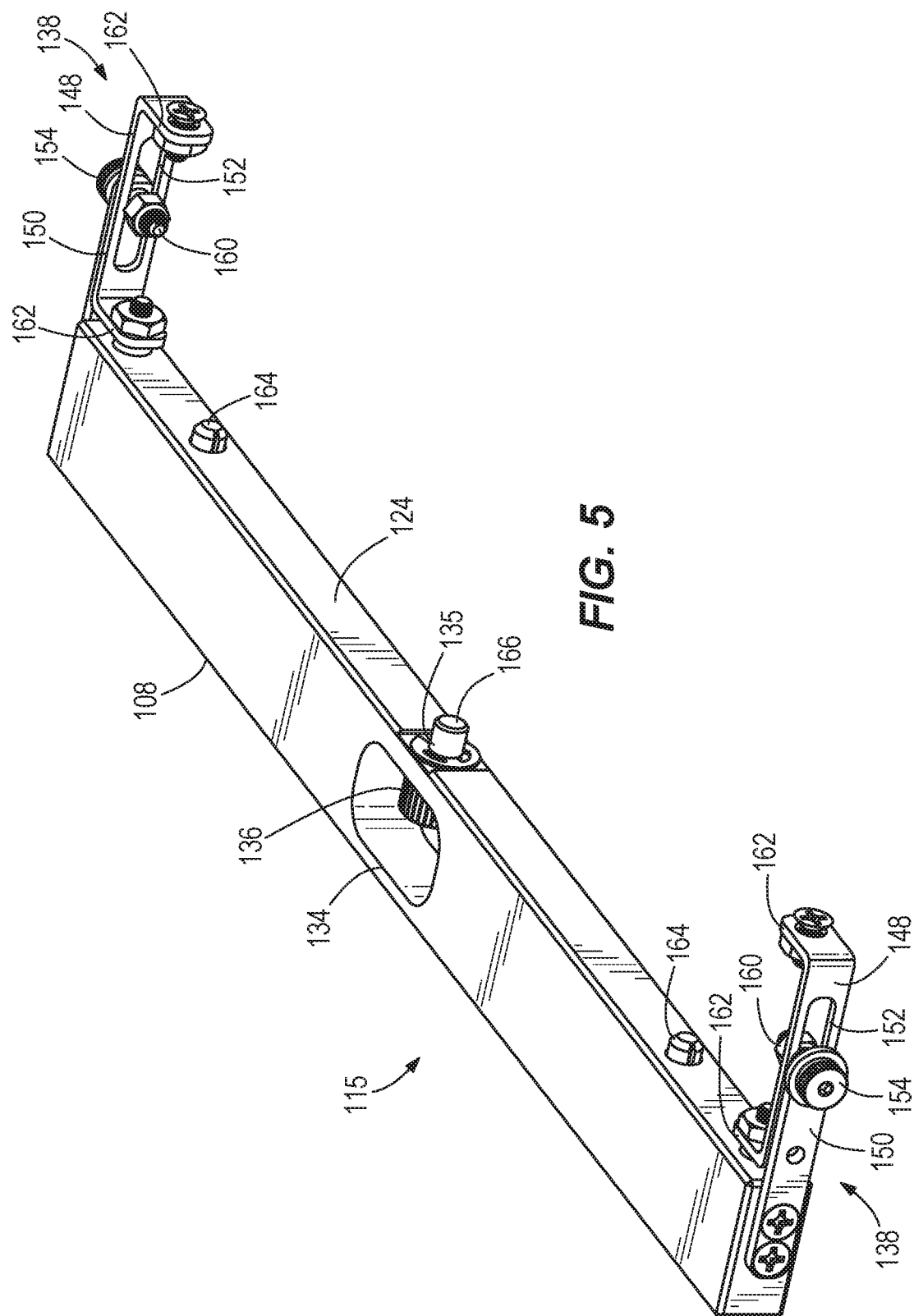
FIG. 5 is a perspective view of the fence assembly of FIG. 1 with portions removed.

With reference to FIG. 5, the secondary fence 115 further includes a locating pin 164 disposed in the second body second side 124 proximate each of the second body infeed and outfeed ends 130 and 132. Likewise, the primary fence 105 includes locating apertures 142 (FIG. 3) disposed in the first body first and second sides 110 and 112. The locating apertures 142 are configured to receive the locating pins 164 to locate the secondary fence 115 relative to the primary fence 105 in one of the first position 156 or the second position 158.

In operation, to relocate the secondary fence 115 between the first position 156 and the second position 158, the fence assembly 100 is first removed from the table 14 (FIG. 1). The dial 136 is loosened to disengage the fence fastener 135 from the threaded bore 144, and the secondary fence 115 is pulled away from the primary fence 105 to disengage the locating pins 164 from the locating apertures 142 in the first body first side 110. With the fence fastener 135 and locating pins 164 disengaged, the secondary fence 115 is pivoted underneath the primary fence 105 until the secondary fence 115 reaches the second position 158 adjacent the first body second side 112. The secondary fence 115 is then pressed toward the primary fence 105 to engage the locating pins 164 with the locating apertures 142 in the first body second side 112. The dial 136 is then tightened to engage the fence fastener 135 with the threaded bore 144, thereby securing the secondary fence 115 to the primary fence 105 in the second position 158. The fence assembly 100 is then positioned back on the table 14 to complete the process.

Figure 7:
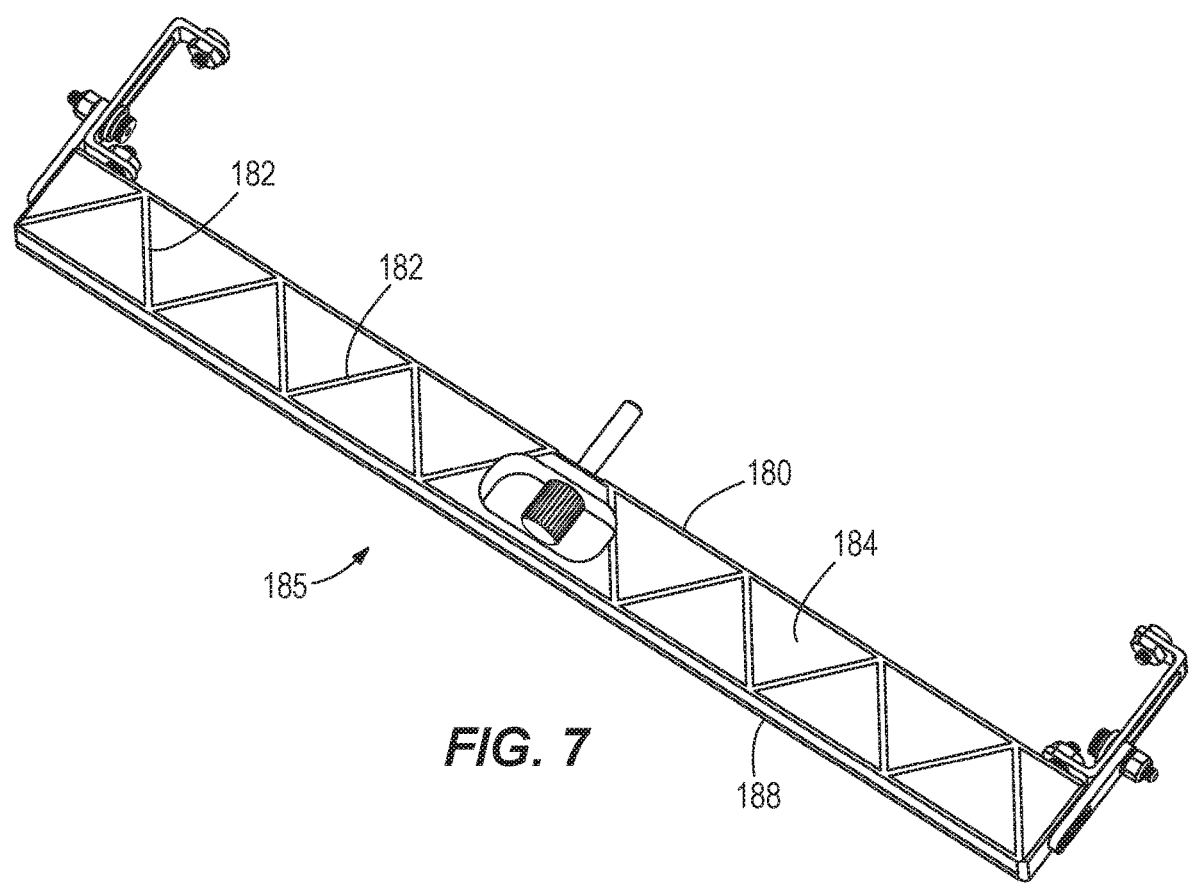
FIG. 7 is a perspective view of the fence assembly of FIG. 1, illustrating the secondary fence formed by a truss.

FIG. 7 illustrates an alternative secondary fence 185 according to another embodiment of the invention. Secondary fence 185 includes an alternative second elongated body 188 defined by a truss 180 having a plurality of truss members 182 made of a first material (e.g., aluminum). In some embodiments, a second material 184 is provided within the spaces defined between the truss members 182. In further embodiments, the first material may have a first density that is greater than a second density of the second material 184.

FIGS. 8-11 illustrate a fence assembly 200 according to another embodiment of the invention. This embodiment employs much of the same structure and has many of the same properties as the fence assembly 100 described above in connection with FIGS. 1-6. Accordingly, the following description focuses primarily upon the structure and features that are different than the embodiments described above in connection with FIGS. 1-6. Features and elements in the embodiments described above in connection with FIGS. 1-6 are numbered in the 200 series of reference numbers.

Figure 8:
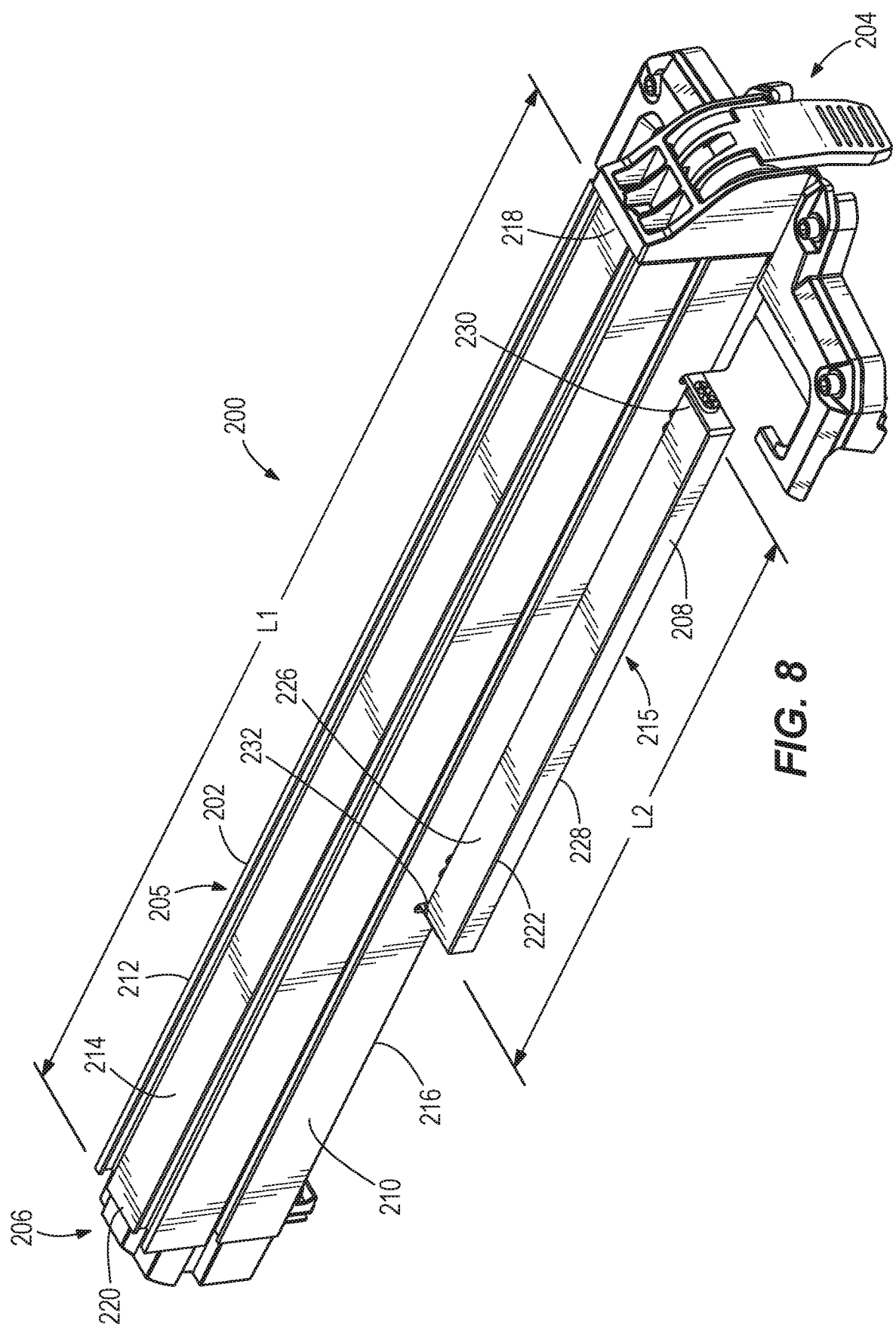
FIG. 8 is a perspective view of a fence assembly in accordance with another embodiment of the invention.

With reference to FIG. 8, the fence assembly 200 includes a primary fence 205 similar to the primary fence 105 (FIG. 1), and a secondary fence 215 similar to the secondary fence 115 (FIG. 1). However, the fence assembly 200 does not include a window, a fence fastener, positioning pins and apertures, or first brackets. Instead, the fence assembly 200 operates via a pivot mechanism 270 (FIG. 9) that pivotally couples the secondary fence 215 to the primary fence 205 proximate each end of the secondary fence 215.

With reference to FIGS. 9 and 10, each pivot mechanism 270 includes a positioning member 272 fastened to the first elongated body 202, and a bracket 250 attached to one of the second body infeed end 230 or the second body outfeed end 132 of the second elongated body 108. A shoulder bolt 254 pivotally couples the bracket 250 to the positioning member 272. The positioning member 272 also includes a detent 274 (e.g., a spring-loaded ball bearing) located proximate each of the first body first and second sides 110, 112 and facing toward the bracket 250. A detent recess 276 is defined in the bracket 250 and configured to receive the detent 274.

Figure 11:
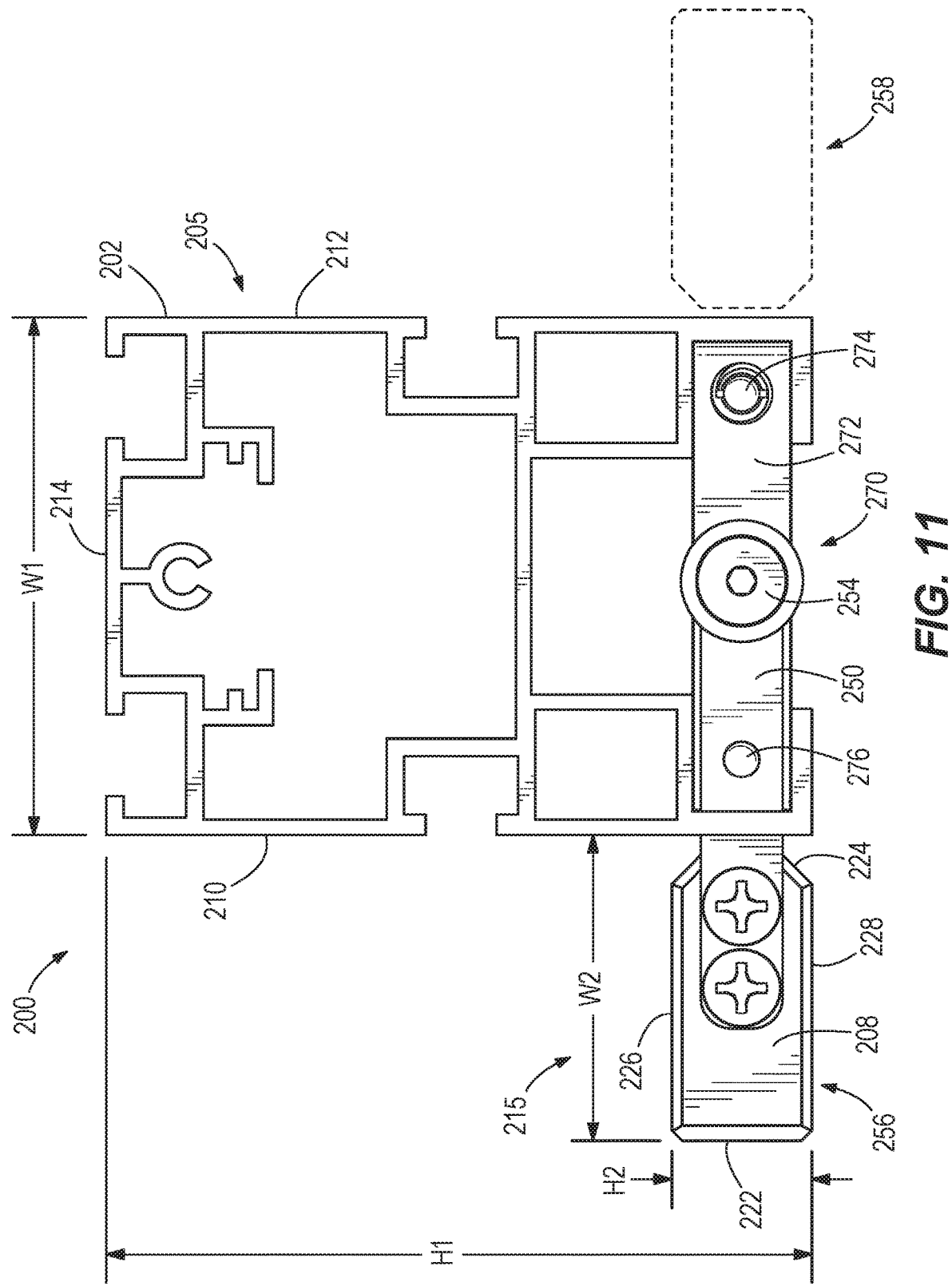
FIG. 11 is an end view of the fence assembly of FIG. 8 with portions removed.

With reference to FIG. 11, the detent 274 proximate the first body first side 210 engages the detent recess 276 to releasably secure the secondary fence 215 in the first position 256. Likewise, the detent 274 proximate the first body second side 212 engages the detent recess 276 to releasably secure the secondary fence 215 in the second position 258. In this regard, the detent 274 and the detent recess 276 together operate to both locate and secure the secondary fence 215 in the first and second positions 256, 258.

In operation, to relocate the secondary fence 215 between the first position 256 and the second position 258, the fence assembly 200 is first removed from the table 14 (FIG. 1). The secondary fence 215 is then pressed downward (i.e., away from the first body bottom side 216) to disengage the detent 274 from the detent recess 276. With the detent 274 and detent recess 276 disengaged, the secondary fence 215 is pivoted away from the first body first side 210 and underneath the primary fence 205 until the secondary fence 215 reaches the stowed position 258 adjacent the first body second side 212. Upon reaching the stowed position 258, the detent 274 engages the detent recess 276 to locate and secure the secondary fence 215 in the stowed position 258. The fence assembly 200 is then positioned back on the table 14 to complete the process.

Various features of the invention are set forth in the following claims.

What is claimed is:

1. A fence assembly for a table saw, the fence assembly comprising:
a primary fence including a first elongated body defining a longitudinal axis and having a first body first side, a first body second side, a first body top side, and a first body bottom side, and a first height measured between the first body top side and the first body bottom side; and
a secondary fence pivotally mounted to the primary fence and pivotable about a pivot axis between a deployed position adjacent one of the first body first side or the first body second side, and a stowed position adjacent the other of the first body first side or the first body second side, the pivot axis extending parallel to the longitudinal axis, the secondary fence including a second elongated body having a second body top side and a second body bottom side, and a second height measured between the second body top side and the second body bottom side;
wherein the second height is less than the first height;
wherein the primary fence includes a positioning member, and the secondary fence includes a bracket rotatably coupled to the positioning member to reposition the secondary fence between the deployed position and the stowed position; and
wherein the positioning member includes a detent, and the bracket includes a detent recess configured to receive the detent, wherein the detent and the detent recess together releasably secure the secondary fence in the deployed position or the stowed position.

2. The fence assembly of claim 1, wherein the secondary fence includes a window and a knob supported at least partially within the window, the knob being located at a proximal end of a fastener configured to engage a threaded bore in the primary fence to releasably secure the secondary fence in one of the deployed position or the stowed position.

3. The fence assembly of claim 1, wherein the primary fence includes a first bracket having an elongated bracket slot, and the secondary fence includes a second bracket slidably and rotatably coupled to the first bracket to reposition the secondary fence between the deployed position and the stowed position.

4. The fence assembly of claim 3, wherein the first elongated body includes a fence slot that receives the second bracket in one of the deployed position or the stowed position.

5. The fence assembly of claim 1, wherein the second elongated body comprises a truss having a plurality of truss members.

6. The fence assembly of claim 1, wherein the secondary fence includes a locating pin, and the primary fence includes a locating aperture configured to receive the locating pin to locate the secondary fence relative to the primary fence in one of the deployed position or the stowed position.

7. The fence assembly of claim 1, wherein:
the first elongated body further includes a first body infeed end and a first body outfeed end, and a first body length measured between the first body infeed end and the first body outfeed end;
the second elongated body further includes a second body infeed end and a second body outfeed end, and a second body length measured between the first body infeed end and the first body outfeed end; and
the second length is less than the first length.

8. The fence assembly of claim 1, wherein the second height is between 9 mm and 18 mm.

9. A fence assembly for a table saw, the fence assembly comprising:
a primary fence including a first elongated body defining a longitudinal axis and having a first body first side, a first body second side, a first body top side, and a first body bottom side, and a first height measured between the first body top side and the first body bottom side; and
a secondary fence pivotally mounted to the primary fence via a pivotable bracket, the secondary fence being pivotable about a pivot axis between a deployed position adjacent one of the first body first side or the first body second side, and a stowed positioned adjacent the other of the first body first side or the first body second side, the pivot axis extending parallel to the longitudinal axis, the secondary fence including a second elongated body having a second body top side and a second body bottom side, and a second height measured between the second body top side and the second body bottom side, the second height being less than the first height;
wherein the first elongated body includes a fence slot defined in the first body bottom side and extending upward into and extending through the first body first side, and wherein the fence slot receives the pivotable bracket when the secondary fence is located adjacent to the first body first side.

10. The fence assembly of claim 9, wherein the fence slot also extends through the first body second side, and wherein the fence slot receives the pivotable bracket when the secondary fence is located adjacent the first body second side.

11. The fence assembly of claim 9, wherein the pivotable bracket comprises a first pivotable bracket and the fence slot comprises a first fence slot, and wherein the secondary fence is further pivotally mounted to the primary fence via a second pivotable bracket, and wherein the first elongated body includes a second fence slot defined in the first body bottom side and extending upward into and extending through the first body first side, and wherein the second fence slot receives the second pivotable bracket when the secondary fence is located adjacent to the first body first side.

* * * * *